United States Patent [19]
Shoen et al.

[11] 3,911,900
[45] Oct. 14, 1975

[54] ROTATING INSTRUMENT PACKAGE

[75] Inventors: Ramon Shoen, Scottsdale; Larry K. Long, Tempe, both of Ariz.

[73] Assignee: Amerco, Inc., Phoenix, Ariz.

[22] Filed: May 28, 1974

[21] Appl. No.: 473,480

Related U.S. Application Data

[63] Continuation-in-part of Ser. No. 267,716, June 29, 1972, abandoned.

[52] U.S. Cl. .......................... 128/2 D; 52/29; 52/234; 312/209; 312/252
[51] Int. Cl.² .................... A61B 10/00; E04H 14/00
[58] Field of Search ............ 128/2 D, 1 R; 312/209, 312/305, 252, 125; 52/29, 173, 234; 214/89

[56] References Cited
UNITED STATES PATENTS

| | | | |
|---|---|---|---|
| 1,929,677 | 10/1933 | Davis .............................. | 312/252 X |
| 2,970,874 | 2/1961 | Honeycutt et al. ............. | 312/252 X |
| 3,118,398 | 1/1964 | Mays .............................. | 312/252 X |
| 3,470,871 | 10/1969 | Shoen .............................. | 128/2 R |
| 3,606,045 | 9/1971 | Abromavage et al. ............... | 214/89 |
| 3,696,805 | 10/1972 | Sweeten et al. ..................... | 128/2 R |
| 3,742,932 | 7/1973 | Greenspan .......................... | 128/1 R |

*Primary Examiner*—Kyle L. Howell
*Attorney, Agent, or Firm*—David H. Semmes

[57] ABSTRACT

A rotating instrument transport system of the type used for rotatably supporting an automated multiphasic health testing instrument package intermediate two examination rooms. A drive system is included for rotating the instrument package 180°, so that opposed sides of the package are alternatively positionable in each examining room. Thus, a single medical instrument package can serve for simultaneous examination of two patients in separate rooms. The device of the present invention is also characterized as possessing means for setting tension between the drive mechanism and the rotatable table which allows for flexibility and control not offered by devices of the prior art.

3 Claims, 12 Drawing Figures

ROTATING INSTRUMENT PACKAGE

CROSS REFERENCES TO RELATED APPLICATIONS:

This application is a continuation-in-part of U.S. Pat. application Ser. No. 267,716, filed 6/29/72 now abandoned.

BACKGROUND OF THE INVENTION:

Of current interest is the field of medical examination, particularly multiphasic health testing. Conventionally, the patient starts at a first station and walks through the testing laboratory from station to station until he arrives at the end of the tested sequence. The patients receive one or more medical tests at each station. The test results are transferred to data processing cards which are subsequently fed into a computer. The computer organizes the test data and prints out a summary which is suitable for evaluation by a physician. Despite the computer, this conventional procedure is time-consuming, relatively inefficient and expensive. Numerous specialized medical personnel are required to man each testing station, resulting in a high degree of "down" time on the part of both medical personnel and patient and a certain amount of confusion is caused by the ambulatory search for the patient for the next designated testing station.

Applicant has improved upon this conventional testing concept in his earlier U.S. Pat. No. 3,470,871 by centrally locating the medical testing equipment within a core surrounded by a periphery of medical examination rooms, each room being attended by a single paramedical aid. The patients were held in place and medical testing instruments were transported in sequence into each room for individual use. The medical instrument package was guided upon a track supported upon the roof of each medical examination room and included control components extensible through a trap door for examination use in each room. In applicant's U.S. Pat. No. 3,696,805, the instrument package itself is supported upon a rotatable core which is rotated so as to expose different instruments sequentially in each examination room.

SUMMARY OF THE INVENTION:

According to the present invention, a rotating instrument transport system has been designed for low cost, fully computerized, multiphasic testing labs of the type embodying a single or a double test room module. The instrument package is mounted upon a rotatable rack such that opposite sides of the package are positioned for independent examining in either one or both of the adjacent modules. As the examination is completed, the package is rotated another 180°, so as to expose the opposed side instrumentation for continuing use.

Figure 1:
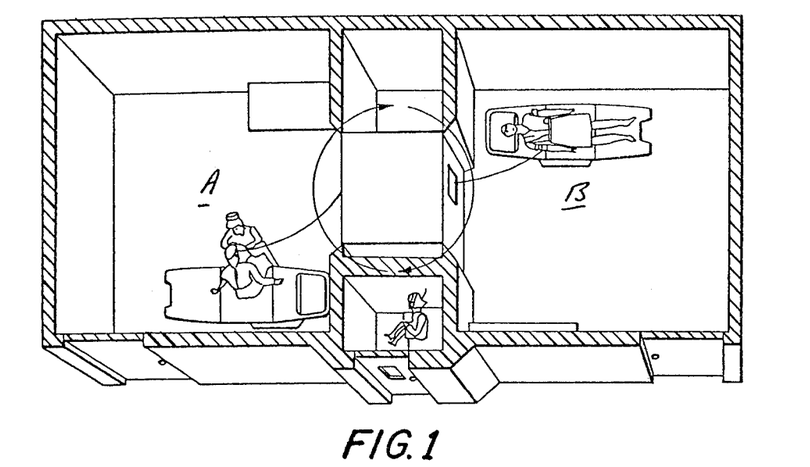
FIG. 1 is a schematic view of a single/double module automated multiphasic health testing service (AMHTS) wherein the present rotating instrument transport system is positioned intermediate the two test rooms.
Figure 2:
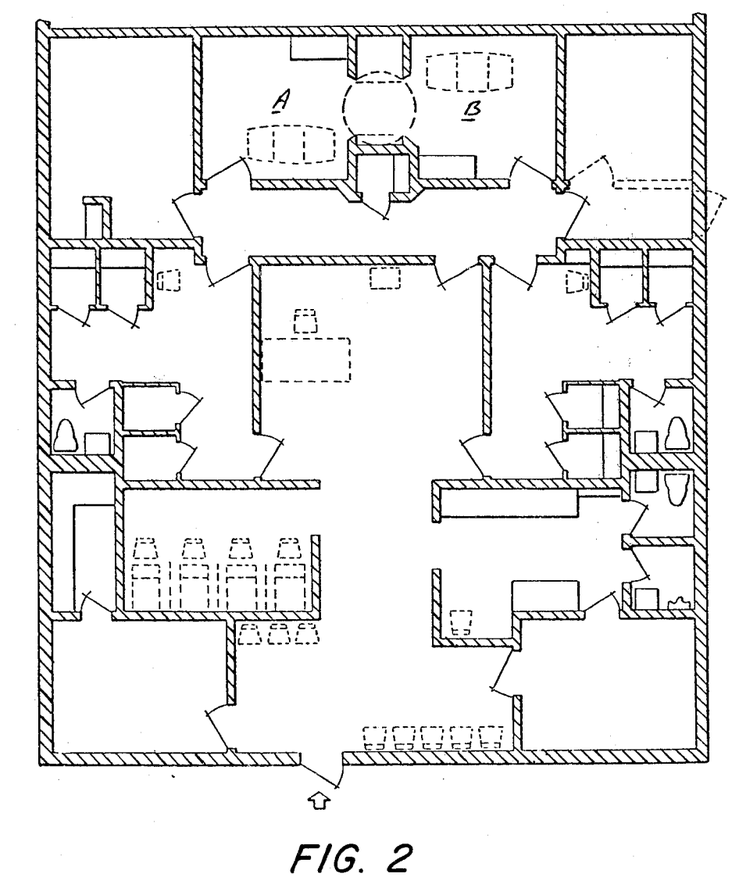
FIG. 2 is a plan view showing integration of the single/double module illustrated in FIG. 1 to an overall multiphasic testing service.
Figure 3:
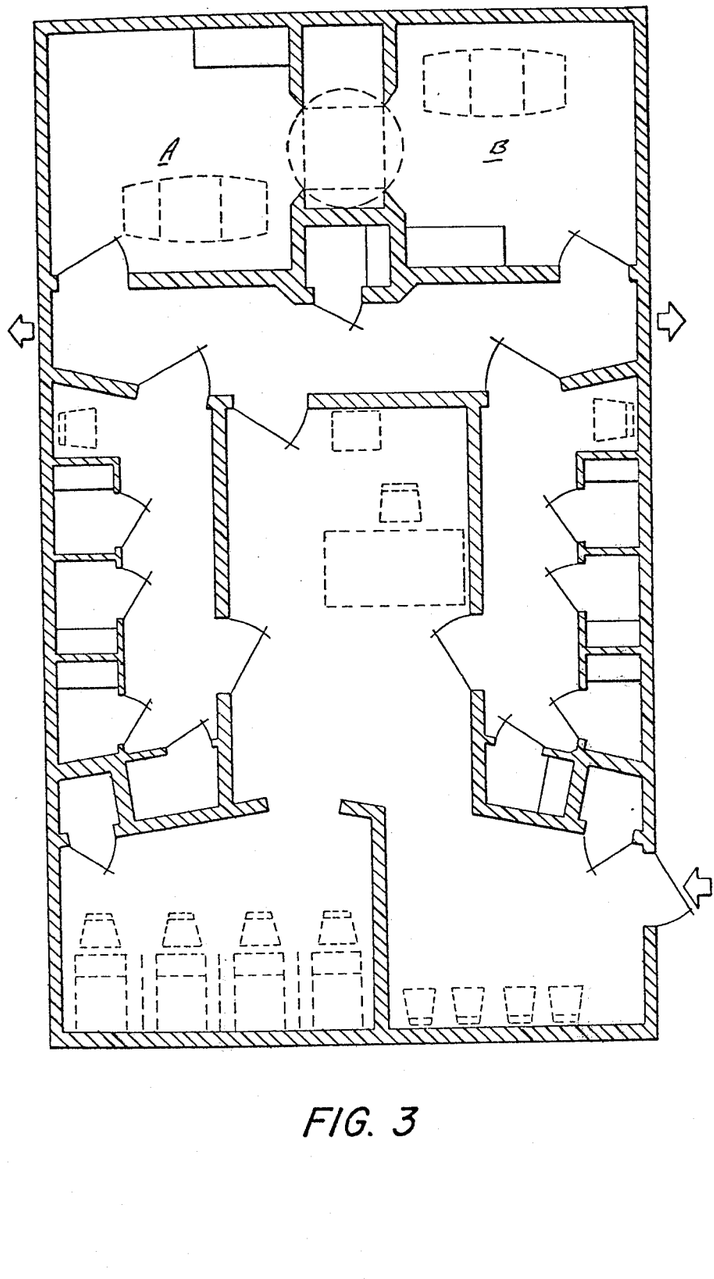
FIG. 3 is a further modification showing integration of the single/double module illustrated in FIG. 1 into a somewhat simpler architectural layout.

DESCRIPTION OF THE PREFERRED EMBODIMENTS:

In FIG. 1 there is illustrated the rotating instrument transporting system positioned intermediate test module A and test module E, the identical unit being shown in FIG. 2, as integrated with an automatic multiphasic health testing service (AMHTS) of the type where the chest X-Ray and blood/urine specimen collection procedures are performed within the AMHTS laboratory. Thus, FIG. 2 laboratory can be incorporated into an existing facility or built as a separate facility requiring approximately 2000 feet of space. In FIG. 3, the system is shown integrated into a smaller layout of approximately 1,000 feet.

Figure 4:
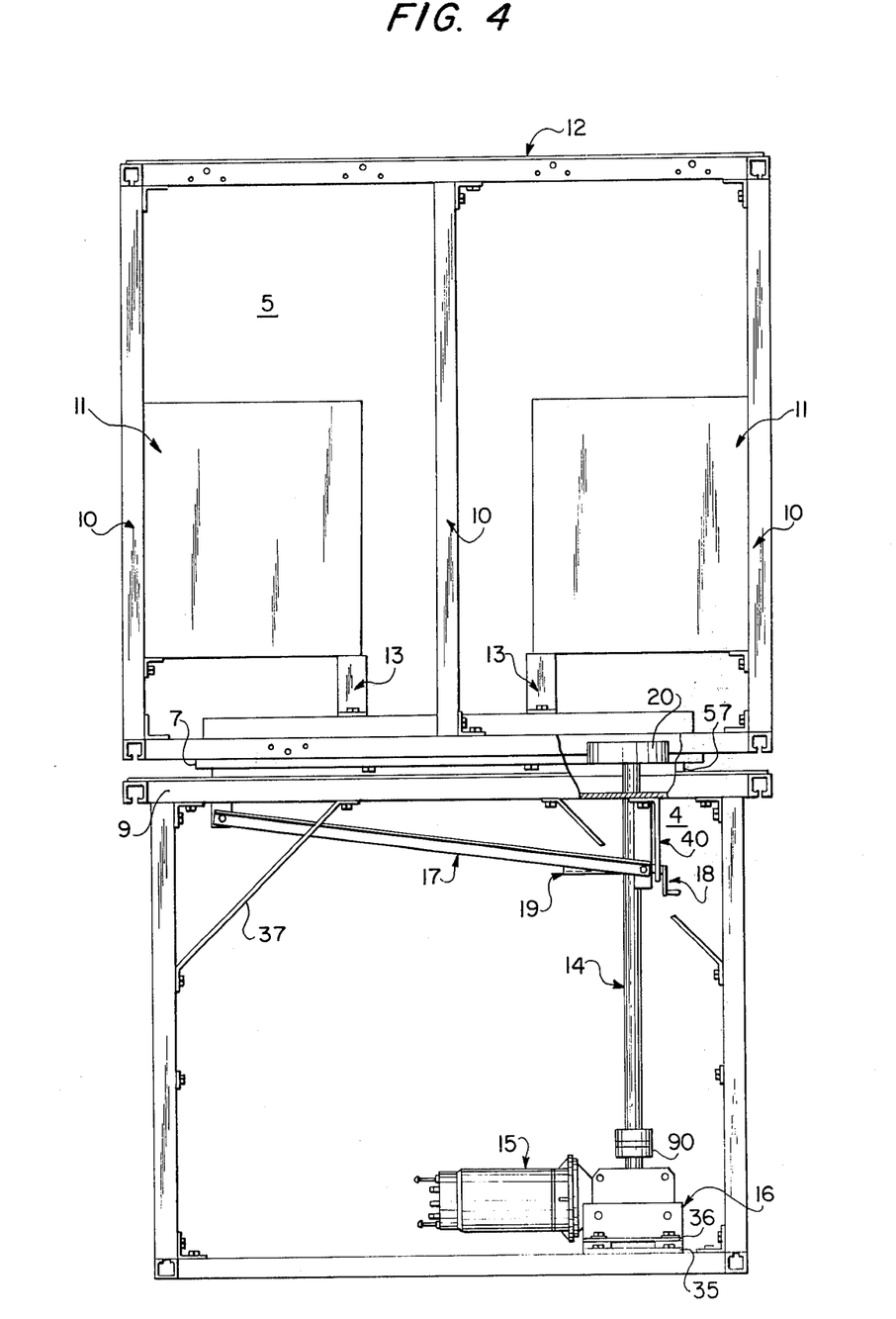
FIG. 4 is a fragmentary perspective view showing in general a motor and drive means of the system.
Figure 5:
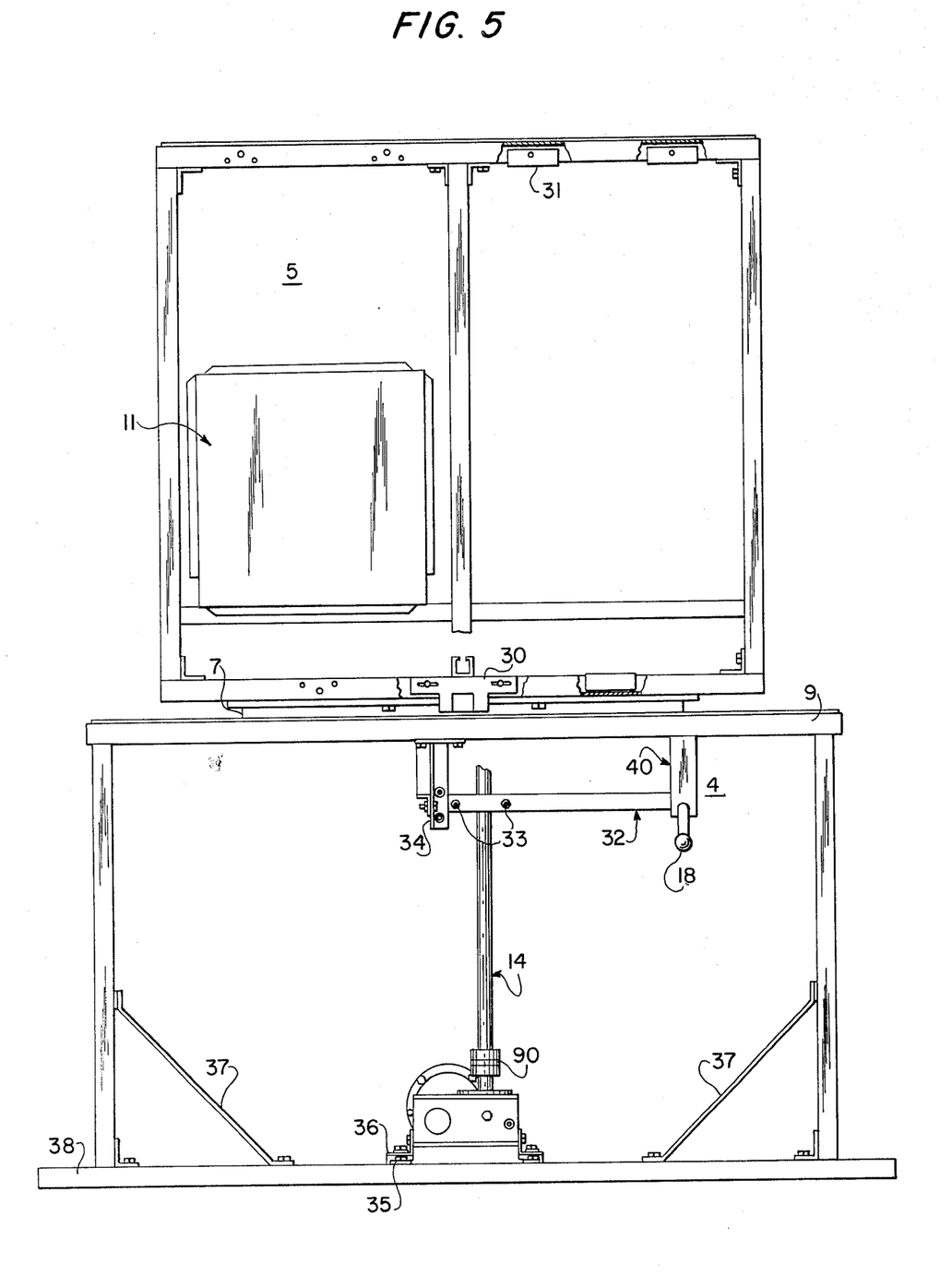
FIG. 5 is a fragmentary perspective as in FIG. 4 taken from a second angle.

In FIGS. 4 and 5 the rotating instrument transport system is shown in more detail. Instruments to be used by the medical practicioner (not shown) are fitted into compartments 11 which are bolted to housing 12 by means of box bracket mountings 13. The entire upper housing 5 rotates 180° through a ball-bearing support element 7/57 driven by drive wheel 20 which is in turn connected to motor 15 by means of shaft 14 via universal joint 90. Motor 15 is held in place by means of bracket motor mount 16 which further contains necessary gearing (not shown). Lower housing 9 being braced by supports 37 further houses crank assembly 4. This assembly is comprised of crank 18 being connected to a threaded shaft 19 and supported to frame 9 by means of braces 17 and 40. Positioning of drive shaft 14 with resultant positioning of drive wheel 20 is changeably selected by turning crank 18 and thus charging the position of pivotal arm 32 which is in turn pivotably supported at brace 34. Arm 32 is rotatably connected to shaft 14 by means of bracket 50 (See FIG. 11) and supporting bolt 33. Motor mount 16 is held to frame 9 by means of motor mount plate 35 and rubber spacer 36.

Figure 6:
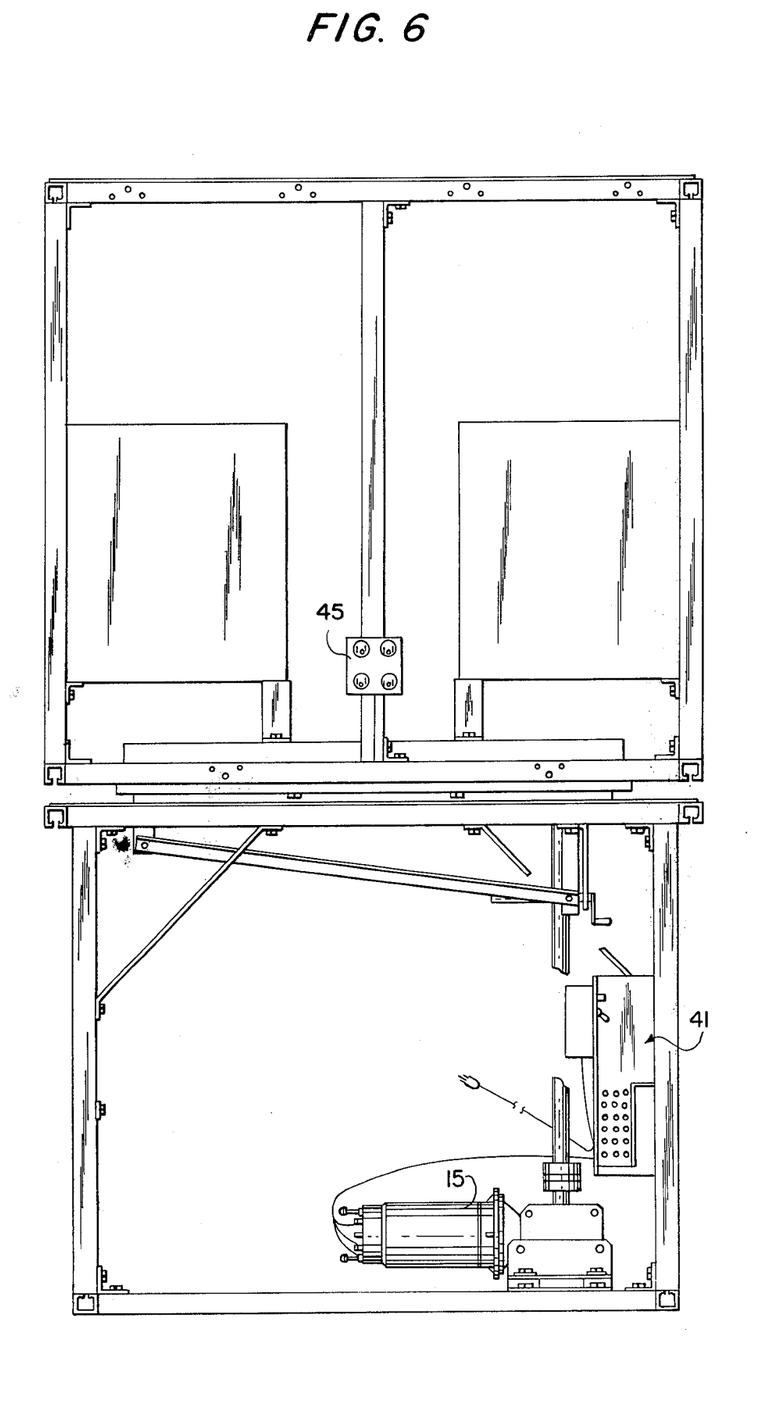
FIGS. 6 and 7 are two views corresponding to FIGS. 4 and 5 further showing control and actuator means for the motor used in rotating the instrument transport table.
Figure 7:
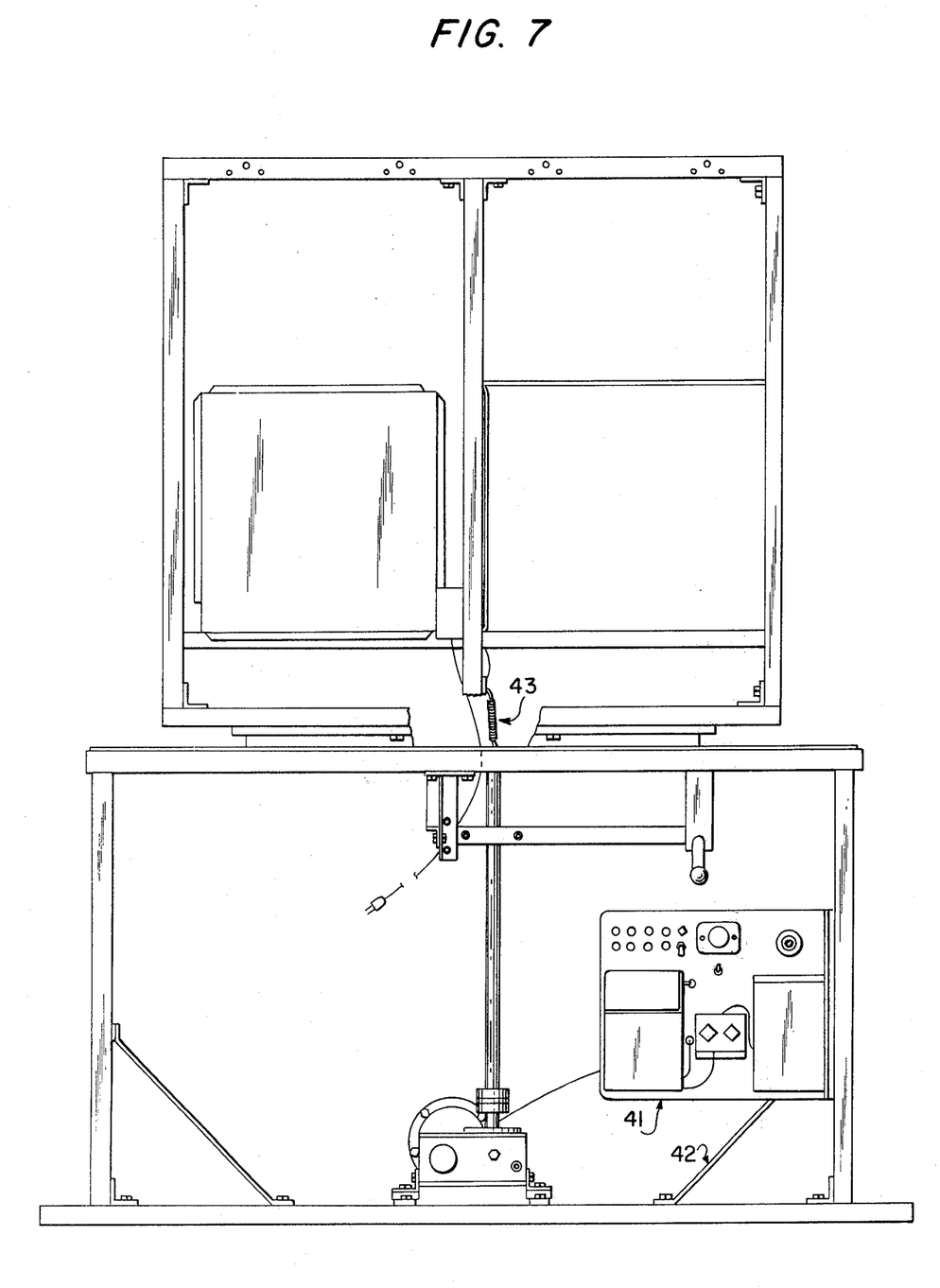

In FIGS. 6 and 7, control box 41 being braced by support 42 is further shown. Such control box can contain conventional electrical apparatus such as an on-off switch, fuses, and a time clock mechanism for adjusting the intervals at which motor 15 is to be actuated. For further flexibility, rotatable instrument transport stand 5 can further be provided with electrical outlets 45 being provided with current by means of coil 43 to thus allow further flexibility for the medical attendant.

Figure 8:
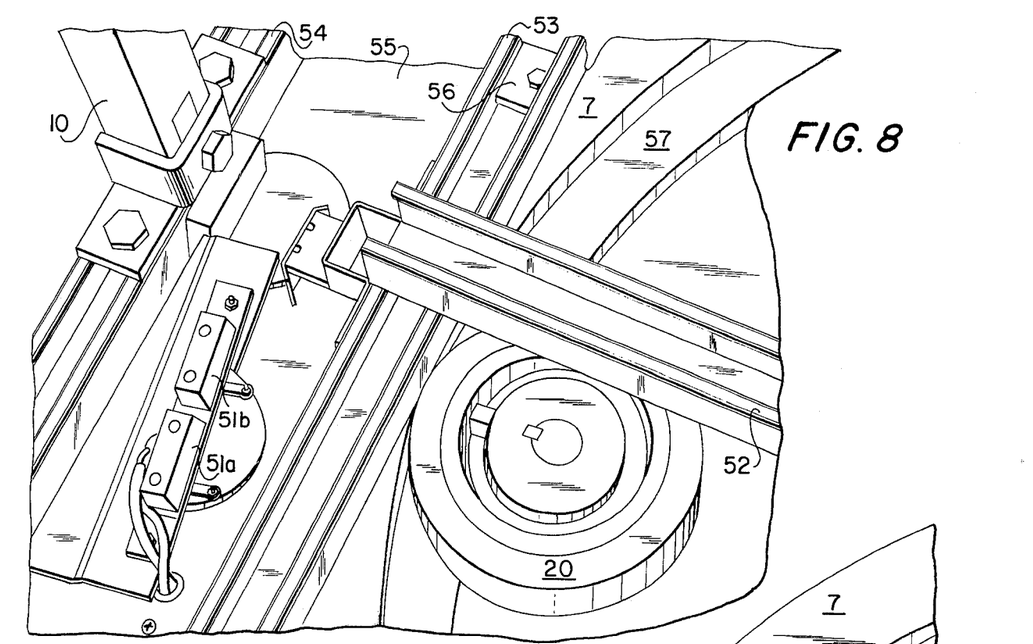
FIGS. 8 and 9 are two fragmentary perspective views of the relay control system in both an open and closed position providing for rotation of the instrument transport table.
Figure 9:
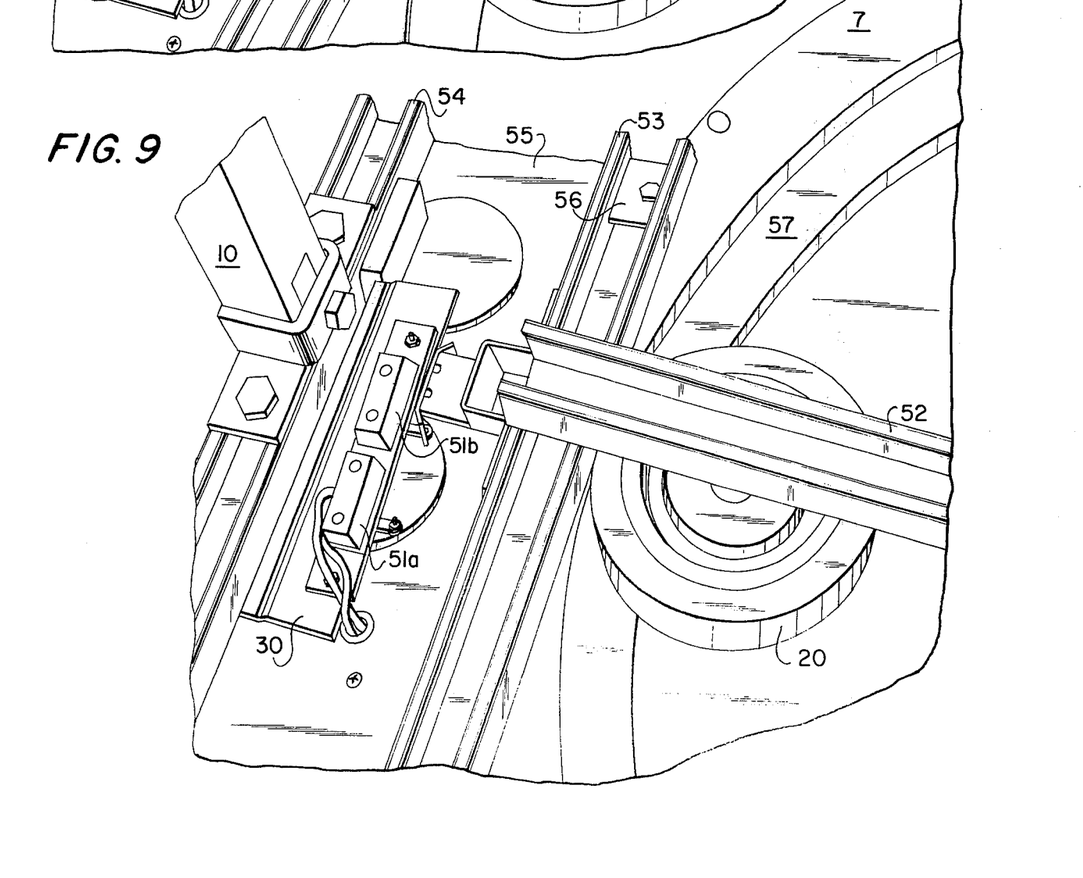

Referring to FIGS. 8 and 9, upon direction from motor 15, drive wheel 20 begins turning and continues to turn until rotatable instrument transport housing turns 180°. Part of housing 5 is represented in FIGS. 8 and 9 by elements 52, 53, and 54 which, thus, rotate 180° with respect to support section 55 which, in turn, supports microswitch 51A and 51B by means of brace 30. An identical microswitch (not shown) is located 180° from microswitch 51A and 51B and engages element 52 upon completion of the 180° turn. Upon completion of said turn, contact of element 52 which microswitch 51B signals motor 15 that the desired revolution has been accomplished and thus turns motor 15 off; only to be reactivated upon signal from the time clock or by manual control. Housing 5 comprising, in part, element 53 is attached to upper ring bearing member 7 by means of bolt and bracket 56. Thus, as drive wheel 20 engages ring bearing section 7, upper housing 5 turns 180° with respect to lower ring bearing section 57 and lower housing 9.

Figure 10:
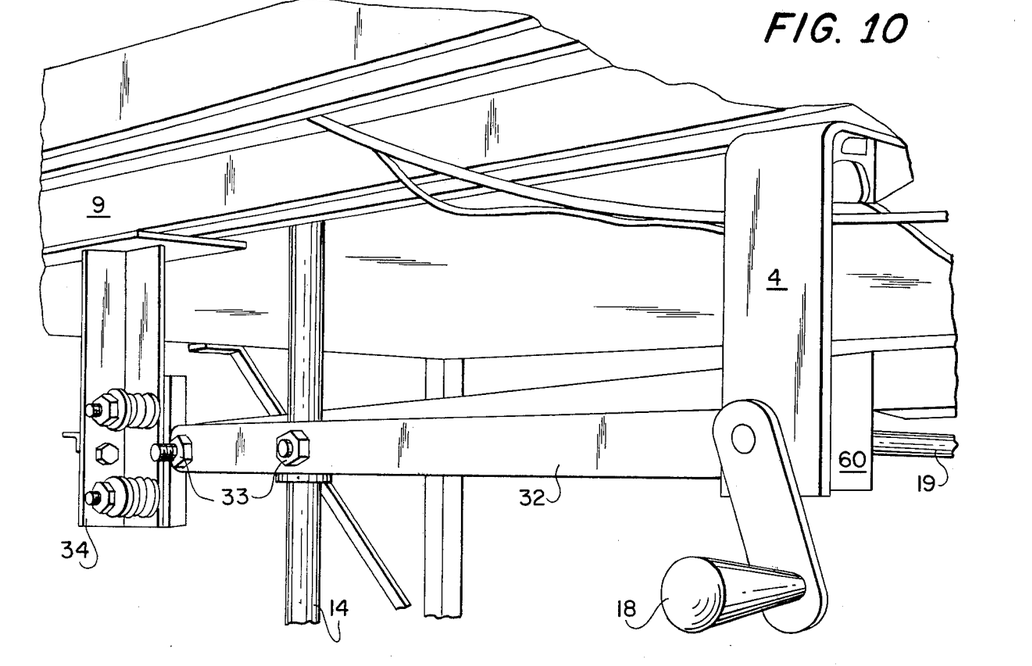
FIGS. 10 and 11 are fragmentary perspective views of the hand control means used to vary the contact between the drive mechanism and the rotatable table.
Figure 11:
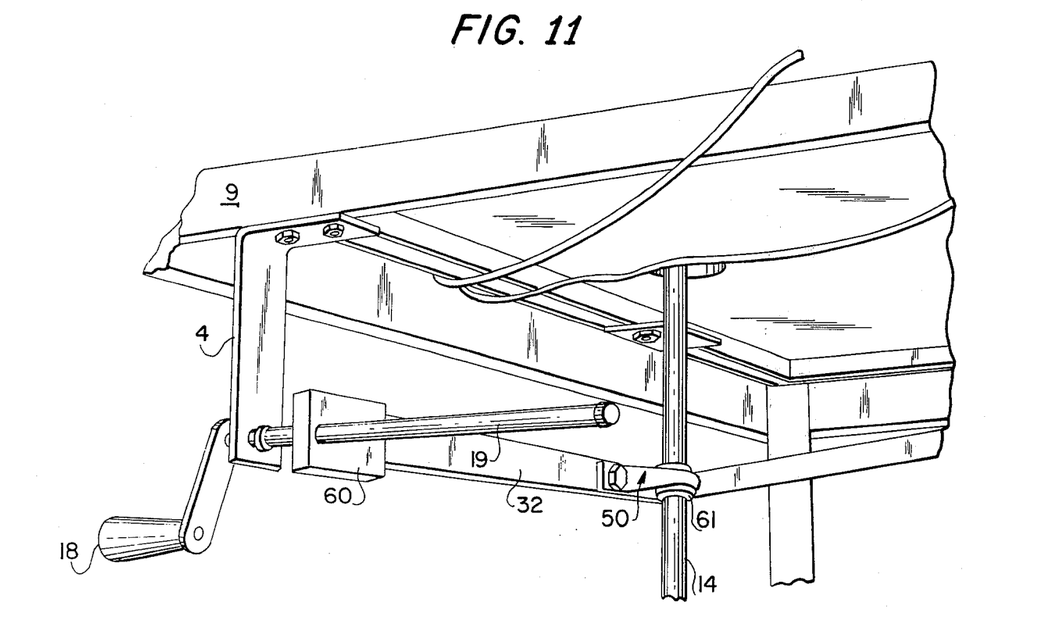

FIGS. 10 and 11 show, in more detail, the crank means useful in adjusting the pressure between drive wheel 20 and ring bearing 7. More specifically, crank 18 is connected with threaded shaft 19 which passes through threaded bolt 60. Crank 18 is mounted to housing 9 by means of bracket 4 and thus represents a portion of the lower non-rotatable section of the present apparatus. As crank 18 is rotated, block 60 moves along the threaded shaft 19 and thus causes pivotable arm 32 to move shaft 14 by means of bracket 50 which is rotatably mounted to shaft 14 by means of ring bearing 61. Movement of shaft 14 causes relative movement between drive wheel 20 and ring bearing 7 and thus can be used in order to cause a proper frictional relationship between the drive wheel and the ring bearing and can also be used in order to disengage drive wheel 20 from ring bearing 7.

Figure 12:
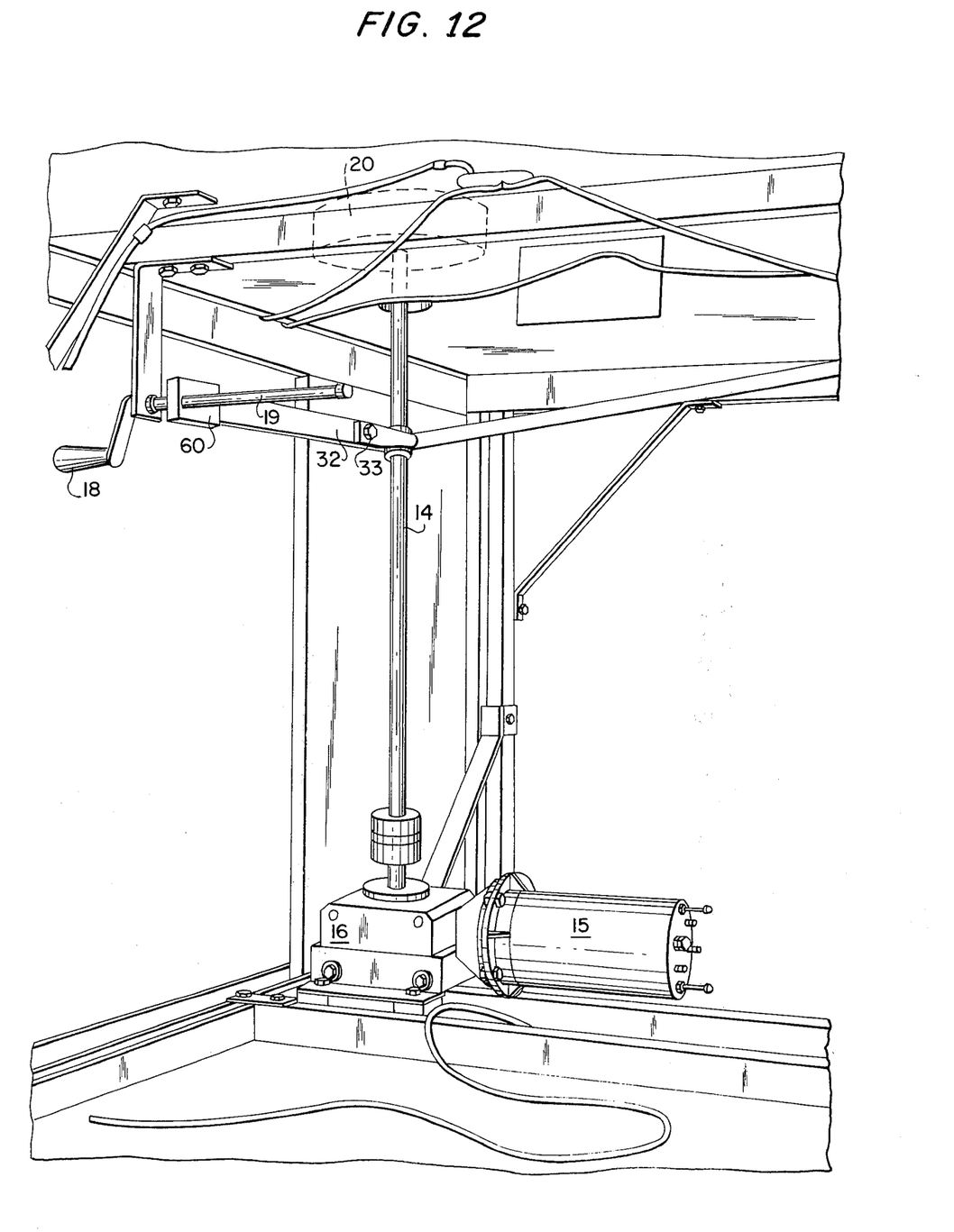
FIG. 12 is a further fragmentary sectional view of the drive mechanism coupled with the hand control.

FIG. 12 is similar to FIGS. 10 and 11 but additionally includes motor 15, bracket motor mount 16 and drive wheel 20.

The laboratory employing the apparatus of the present invention will accommodate a volume of up to 28 patients per day or 7,000 patients per year, during a single shift operation. It is designed initially to operate at a single module system with a testing capacity of up to 14 per day and when the second module is made operative, the capacity will thus be doubled to 28 patients. This unique laboratory is a fully computerized facility. It is low cost. The per patient cost of testing is low, even at low patient volume. The laboratory incorporates the module concept of multiphasic testing, wherein the majority of the test procedures are performed in one room (module) by the same technician.

The rotating instrument transport system has two instrument carrying surfaces, one of which faces into each test module. At capacity operation, a patient can alternately enter a module every 15 minutes. The patient remains in a module for 30 minutes, during which time both the rotating instrument transporting system faces have been rotated into the module. The instrument carrier is rotated to 180° every 15 minutes. Thus, one set of instruments can serve both modules, resulting in substantial economy and efficient instrument usage.

Expensive instrumentation, such as in automatic three-channel electrocardiograph, can be located near the main desk in the reception area. It is electrically switched to each module by means of transducer leads. The automatic recording audiometer is also operated and monitored at the main desk.

Medical instrumentation can also be installed in each module. This is feasible for inexpensive equipment and equipment which can increase the overall efficiency of the testing procedures when mounted in each module. For example, vision testing apparatus is mounted in an overhead console. It permits the tests to be performed efficiently and also provides an overhead console for other applications, such as switch panels. Test procedures—such as chest X-rays which cannot be performed economically or efficiently within the test module are performed just before entering or after leaving the test module.

Manifestly, the instrumentation package, as the rotatable rack and drive means may be varied without departing from the spirit of invention.

We claim:

1. A rotating instrument transport system in combination with a double examination room test module, said rotating instrument transport system being interposed intermediate each room in said module such that an instrument package can be positioned for simultaneous medical testing in each room then rotated for reciprocal medical testing in each room, said instrument transport system comprising:
   A. a support frame, including:
      i. a pivoting tension arm pivoted to said frame at one end and including an adjustable tension means interconnecting the arm and said frame;
   B. a rack rotatably mounted upon the frame by means of a ring bearing support rotatably suspended from said frame;
   C. a drive motor supported upon said frame and including a rotable drive shaft and drive wheel affixed to the shaft so as to be engageable with said rack, said shaft extending through said pivoting tension arm so as to vary the degree of engagement of said wheel with said rack, according to the adjustment of said tension means and
   D. a medical examination instrument package, including testing components mounted upon the rack which is positioned in turn on said ringbearing support and including:
      i. independent operating controls mounted on each opposed side such that the package may be controlled independently from opposed sides and from within the examination room in which it is positioned.

2. A rotating instrument transport system as in claim 1, including a time clock means operably connected to said drive means, to selectively actuate said drive means and rotatably drive said instrument package in a 180° sector, according to a predetermined time sequence.

3. A rotating instrument transport system as in claim 1, wherein each of said examination rooms includes individual examination tables proximate to instruments rotatably transported thereto by said rotating instrument transport system.

* * * * *